(12) United States Patent
Dhandapani

(10) Patent No.: US 9,507,744 B2
(45) Date of Patent: Nov. 29, 2016

(54) HANDLING TWO SGPIO CHANNELS USING SINGLE SGPIO DECODER ON A BACKPLANE CONTROLLER

(71) Applicant: AMERICAN MEGATRENDS, INC., Norcross, GA (US)

(72) Inventor: Kayalvizhi Dhandapani, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 456 days.

(21) Appl. No.: 14/100,613

(22) Filed: Dec. 9, 2013

(65) Prior Publication Data

US 2015/0161069 A1 Jun. 11, 2015

(51) Int. Cl.
*H05K 7/10* (2006.01)
*G06F 13/40* (2006.01)
*G06F 13/38* (2006.01)

(52) U.S. Cl.
CPC ......... *G06F 13/4054* (2013.01); *G06F 13/385* (2013.01); *G06F 13/409* (2013.01); *G06F 13/4068* (2013.01)

(58) Field of Classification Search
None
See application file for complete search history.

(56) References Cited

U.S. PATENT DOCUMENTS

| | | | | |
|---|---|---|---|---|
| 2012/0185626 A1* | 7/2012 | Stuhlsatz | ............ | G06F 13/4022 710/105 |
| 2012/0246385 A1* | 9/2012 | Dhandapani | ........ | G06F 12/0246 711/103 |
| 2012/0278661 A1* | 11/2012 | Cong | ..................... | G11B 33/10 714/39 |
| 2012/0324131 A1* | 12/2012 | Chang | ................. | G06F 13/4282 710/106 |
| 2013/0080697 A1* | 3/2013 | Dhandapani | ........ | G06F 11/3034 711/114 |
| 2014/0149785 A1* | 5/2014 | Bunker | ................... | G06F 13/14 714/6.2 |
| 2014/0344483 A1* | 11/2014 | Chen | ..................... | G06F 11/328 710/19 |

* cited by examiner

*Primary Examiner* — Henry Tsai
*Assistant Examiner* — Aurangzeb Hassan
(74) *Attorney, Agent, or Firm* — Locke Lord LLP; Tim Tingkang Xia, Esq.

(57) ABSTRACT

An aspect of present disclosure relates to a computer-implemented method for handling two SGPIO channels by using one SGPIO decoder. The method includes: (a) establishing communication between a backplane controller and a host computer through HBA, (b) receiving control commands and control data for monitoring and controlling a first and a second group of drive slots, (c) checking a clock signal having a first time period and a second time period, (d) forwarding the control commands and control data for the first group to the first group of drive slots during first time period, and forwarding the control commands and control data for the second group to the second group of drive slots during second time period, (e) receiving responses from first and second group of drive slots, respectively, and (f) sending the responses from first and second group of drive slots to the host computer.

26 Claims, 5 Drawing Sheets

| DRIVE SLOT NUMBER | DEVICE NUMBER | TIMING PERIOD |
| --- | --- | --- |
| 1 | 1 | A |
| 2 | 2 | A |
| 3 | 3 | A |
| 4 | 4 | A |
| 5 | 1 | B |
| 6 | 2 | B |
| 7 | 3 | B |
| 8 | 4 | B |

FIG. 4

HANDLING TWO SGPIO CHANNELS USING SINGLE SGPIO DECODER ON A BACKPLANE CONTROLLER

FIELD

The present disclosure generally relates to a backplane with a backplane controller, and more particularly to handle two SGPIO channels using one SGPIO decoder on a backplane controller.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

In a data center with large amount of storage space, a backplane is used to mount a number of storage drives, such as Disk Arrays, redundant array of independent disks (RAID) Subsystems, Small Computer System Interface (SCSI) and Fiber Channel (FC) Disk Array, and Switched Disk Array Servers. A host bus adapter (HBA) is used to facilitate the communication between a host computer and the backplane, and allows the host computer to monitor and manage the storage drives installed on the backplane. The backplane controller provides an operator with detailed information regarding the presence and status of mass storage devices, and provides facilities for generating visual indicators based upon backplane management data received from the HBA of the host computer. For instance, individual light-emitting diodes ("LEDs") may be driven by a backplane controller for displaying information regarding the activity, failure, rebuild status, and other information for each of the mass storage devices connected to the backplane. In order to provide these indicators and other types of functionality, a backplane typically provides connections for multiple mass storage devices, such as hard disk drives.

A backplane is a circuit board with connectors and power circuitry into which storage drives are attached. They can have multiple slots, each of which can be populated with a storage drive. Typically the backplane is equipped with LEDs which by their color and activity indicate the status of the storage drives connected to the backplane. Typically, a storage drive's LED will emit a particular color or blink pattern to indicate its current status such as a storage drive is attached to the backplane, working, accessing data, or in fail state. The backplane also interfaces with an HBA and provides an interface through which the HBA may communicate with the mass storage devices. A backplane also may receive and transmit backplane management data to and from the HBA. Backplane management data is any data relating to the provision of backplane management services by a backplane.

Several different physical interfaces may be utilized to deliver backplane management data between an HBA and a backplane. For instance, some Serial Attached SCSI ("SAS")-compatible HBAs are equipped with a serial general purpose input/output interface ("SGPIO"). Some Serial Advanced Technology Attachment ("SATA")-compatible HBAs, on the other hand, utilize a control or management bus, such as the system management bus, to exchange backplane management data between the backplane and the HBA.

The particular protocol utilized to transfer backplane management data between the backplane and the HBA may also vary from vendor to vendor. However, the most popular protocols used in the backplane management are: the SCSI Enclosure Services (or SES) utilizing the system management bus (or I²C bus), and the SGPIO protocol utilizing an SGPIO interface to exchange backplane management information between the HBA and the backplane. For example, when one SGPIO channel with one SGPIO decoder is used in a backplane controller, the backplane controller monitors and manages up to four storage drives. If eight storage drives are to be managed by the backplane controller, another SGPIO sideband with another SGPIO controller is to be added. On the other hand, in order to reduce the hardware complexity and the cost of fabricating backplane controller chip, it is desirable to have a simplified backplane controller chip with reduced hardware, such as having one SGPIO controller for both SGPIO sidebands, and let firmware of the backplane controller to handle two SGPIO channels using one SGPIO decoder on a backplane controller.

Therefore, heretofore unaddressed needs still exist in the art to address the aforementioned deficiencies and inadequacies.

SUMMARY

In one aspect, the present disclosure relates to a backplane controller for handling two SGPIO channels by using one SGPIO decoder. In certain embodiments, the backplane controller has a backplane controller chip installed on the backplane controller of a backplane. The backplane controller chip has: (a) a first SGPIO channel interface, (b) a second SGPIO channel interface, (c) an SGPIO decoder, (d) a first SGPIO output, (e) a second SGPIO output, and (f) firmware of the backplane controller. The first SGPIO channel interface is in communication with a first channel of an SGPIO interface of a host bus adapter (HBA) for receiving control commands and control data from a user at a host computer for a first group of drive slots on the backplane. The second SGPIO channel interface is in communication with a second channel of the SGPIO interface of the HBA for receiving control commands and control data from the user for a second group of drive slots on the backplane. The SGPIO decoder is in communication with the first group of drive slots and the second group of drive slots in an alternating base according a clock signal. The first SGPIO output connects the output of the SGPIO decoder to the first group of drive slots. The second SGPIO output connects the output of the SGPIO decoder to the second group of drive slots. The firmware of the backplane controller controls the operation of the backplane controller chip.

In certain embodiments, the communication between the first SGPIO channel interface of the backplane controller and the first channel of the SGPIO interface of the HBA is through a first SGPIO bus, and the communication between the second SGPIO channel interface of the backplane controller and the second channel of the SGPIO interface of the HBA is through a second SGPIO bus. Each of the first group of drive slots and the second group of drive slots includes up to 4 storage drives, and each of the first group of drive slots is designated by a first device number, and each of the second group of drive slots is designated by a second device number.

In certain embodiments, the backplane controller is in communication with the host computer through the HBA. The HBA has (a) a PCI interface, (b) a host bus adapter controller, and an SGPIO interface. The PCI interface is configured for the user to send control commands and control data to at least one drive of the first group of drive slots and the second group of drive slots for monitoring and controlling the at least one drive, and receive response from the at least one drive. The host bus adapter controller includes firmware for performing HBA operations. The SGPIO interface of the HBA has a first SGPIO channel and a second SGPIO channel. The first SGPIO channel and the second SGPIO channel are used to communicate with the first SGPIO channel interface and the second SGPIO channel interface of the SGPIO decoder of the backplane controller chip, respectively.

In certain embodiments, the firmware of the backplane controller is configured to perform one or more of following operations: (a) receiving control commands and control data from the user for monitoring and controlling the first group of drive slots through the first SGPIO channel interface of the backplane controller chip; and for monitoring and controlling the second group of drive slots through the second SGPIO channel interface of the backplane controller chip, (b) checking a clock signal having a first time period and a second time period, (c) forwarding the control commands and control data from the first SGPIO channel interface of the backplane controller chip to the first group of drive slots through the first SGPIO output during the first time period, and forwarding the control commands and control data from the second SGPIO channel interface of the backplane controller chip to the second group of drive slots through the second SGPIO output during the second time period, (d) receiving response through the first SGPIO output from the drive of the first group of drive slots to which the control commands and control data are directed during the first time period, and receiving response through the second SGPIO output from the drive of the second group of drive slots to which the control commands and control data are directed during the second time period, and (e) sending the response from the drive of the first group of drive slots to the host computer through the first SGPIO channel interface of the backplane controller chip, and sending the response from the drive of the second group of drive slots to the host computer through the second SGPIO channel interface of the backplane controller chip. The first time period and the second time are substantially equal.

In certain embodiments, the control data includes the first device number for the drive of the first group of drive slots to which the control commands and control data are directed, and the second device number for the drive of the second group of drive slots to which the control commands and control data are directed. In one embodiment, the control commands and the control data are configured in accordance with the SGPIO specification to instruct the backplane controller to monitor the drive and LEDs associated with the drive, and control the functions of the drive, and the LEDs associated with the drive. In another embodiment, the control commands and the control data are configured in accordance with the IPMI specification to instruct the backplane controller to monitor the drive and LEDs associated with the drive, and control the functions of the drive, and the LEDs associated with the drive. The IPMI control commands may include certain extended OEM IPMI commands.

In another aspect, the present disclosure relates to a computer-implemented method for handling two SGPIO channels by using one SGPIO decoder. In certain embodiments, the computer-implemented method includes one or more of following operations: (a) establishing communication between a backplane controller on a backplane and a host computer through a host bus adapter (HBA) over an SGPIO interface, (b) receiving control commands and control data from a user for monitoring and controlling a first group of drive slots through a first SGPIO channel interface of the backplane controller; and for monitoring and controlling a second group of drive slots through a second SGPIO channel interface of the backplane controller, (c) checking a clock signal having a first time period and a second time period, (d) forwarding the control commands and control data from the first SGPIO channel interface of the backplane controller chip to the first group of drive slots through a first SGPIO output of the backplane controller during the first time period, and forwarding the control commands and control data from the second SGPIO channel interface of the backplane controller chip to the second group of drive slots through a second SGPIO output of the backplane controller during the second time period, (e) receiving response through the first SGPIO output from the drive of the first group of drive slots to which the control commands and control data are directed during the first time period, and receiving response through the second SGPIO output from the drive of the second group of drive slots to which the control commands and control data are directed during the second time period, and (f) sending the response from the drive of the first group of drive slots to the host computer through the first SGPIO channel interface of the backplane controller chip, and sending the response from the drive of the second group of drive slots to the host computer through the second SGPIO channel interface of the backplane controller chip.

In certain embodiments, the backplane controller is in communication with the host computer through the HBA. The HBA has: (a) a PCI interface configured for the user to send control commands and control data to at least one drive of the first group of drive slots and the second group of drive slots for monitoring and controlling the at least one drive, and receive response from the at least one drive, (b) a host bus adapter controller having firmware configured to perform HBA operations, and (c) an SGPIO interface having a first SGPIO channel and a second SGPIO channel, configured to communicate with the first SGPIO channel interface and the second SGPIO channel interface of the SGPIO decoder of the backplane controller chip, respectively.

In certain embodiments, the backplane controller includes: (a) a first SGPIO channel interface, (b) a second SGPIO channel interface, (c) an SGPIO decoder, (d) a first SGPIO output, (e) a second SGPIO output, and (f) firmware of the backplane controller. The communication between the first SGPIO channel interface of the backplane controller and the first SGPIO channel of the SGPIO interface of the HBA is through a first SGPIO bus, the communication between the second SGPIO channel interface of the backplane controller and the second SGPIO channel of the SGPIO interface of the HBA is through a second SGPIO bus.

In yet another aspect, the present disclosure relates to a non-transitory computer storage medium. In one embodiment, the non-transitory computer storage medium stores computer-executable instructions. When these computer-executable instructions are executed by a processor of a backplane controller, cause the processor to perform one or more of following operations to handling two SGPIO channels by using one SGPIO decoder: (a) establishing communication between a backplane controller on a backplane and a host computer through a host bus adapter (HBA) over an SGPIO interface, (b) receiving control commands and control data from a user for monitoring and controlling a first group of drive slots through a first SGPIO channel interface of the backplane controller; and for monitoring and controlling a second group of drive slots through a second SGPIO channel interface of the backplane controller, (c) checking a clock signal having a first time period and a second time period, (d) forwarding the control commands and control data from the first SGPIO channel interface of the backplane controller chip to the first group of drive slots through a first SGPIO output of the backplane controller during the first time period, and forwarding the control commands and control data from the second SGPIO channel interface of the backplane controller chip to the second group of drive slots through a second SGPIO output of the backplane controller during the second time period, (e) receiving response through the first SGPIO output from the drive of the first group of drive slots to which the control commands and control data are directed during the first time period, and receiving response through the second SGPIO output from the drive of the second group of drive slots to which the control commands and control data are directed during the second time period, and (f) sending the response from the drive of the first group of drive slots to the host computer through the first SGPIO channel interface of the backplane controller chip, and sending the response from the drive of the second group of drive slots to the host computer through the second SGPIO channel interface of the backplane controller chip.

BRIEF DESCRIPTION OF THE DRAWINGS

The accompanying drawings illustrate one or more embodiments of the present disclosure and, together with the written description, serve to explain the principles of the present disclosure. Wherever possible, the same reference numbers are used throughout the drawings to refer to the same or like elements of an embodiment, and wherein:

FIG. 4 shows a device number, timing periods and drive number table according certain embodiments of the present disclosure.

DETAILED DESCRIPTION

Figure 1:
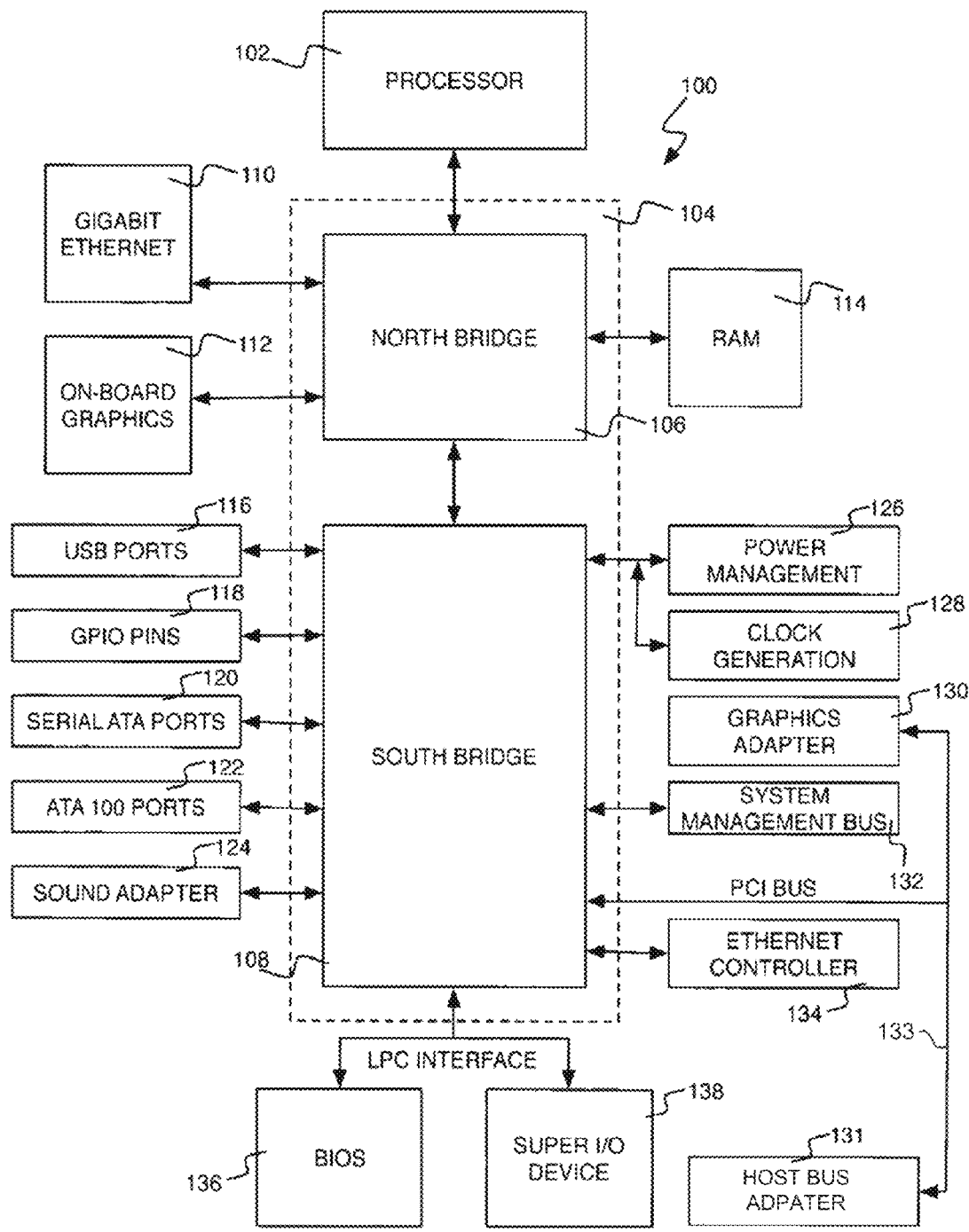
FIG. 1 schematically shows a computer architecture diagram showing aspects of a computer utilized as an illustrative operating environment for the various embodiments of the present disclosure.

The present disclosure is more particularly described in the following examples that are intended as illustrative only since numerous modifications and variations therein will be apparent to those skilled in the art. Various embodiments of the present disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the present disclosure, and in the specific context where each term is used. Certain terms that are used to describe the present disclosure are discussed below, or elsewhere in the specification, to provide additional guidance to the practitioner regarding the description of the present disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the present disclosure or of any exemplified term. Likewise, the present disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximates, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, FIGS. 1-5, in which embodiments of the present disclosure are shown. This disclosure may, however, be embodied in many different forms and should not be construed as limited to the embodiments set forth herein; rather, these embodiments are provided so that this disclosure will be thorough and complete, and will fully convey the scope of the present disclosure to those skilled in the art. Like numbers refer to like elements throughout.

FIG. 1 and the following discussion are intended to provide a brief, general description of a suitable computing environment in which the present disclosure may be implemented. Generally, program modules include routines, programs, components, data structures, and other types of structures that perform particular tasks or implement particular abstract data types. Moreover, those skilled in the art will appreciate that the present disclosure may be practiced with other computer system configurations, including hand-held devices, multiprocessor systems, microprocessor-based or programmable consumer electronics, minicomputers, mainframe computers, and the like. The present disclosure may also be practiced in distributed computing environments where tasks are performed by remote processing devices that are linked through a communications network. In a distributed computing environment, program modules may be located in both local and remote memory storage devices.

Referring now to FIG. 1, details regarding an illustrative operating environment for embodiments of the present disclosure will be provided. In particular, FIG. 1 illustrates a computer configuration for practicing the embodiments of the present disclosure. It should be appreciated, however, that although the embodiments of the present disclosure described herein are discussed in the context of a conventional desktop or server computer, the embodiments of the present disclosure may be utilized with virtually any type of computing device.

As described briefly above, the embodiments of the present disclosure provide a method and integrated circuit for enabling the use of multiple backplane management interfaces and multiple backplane management protocols. FIG. 1 illustrates a host computer that, as will be described in greater detail below, may utilize one or more backplanes to interface with one or more mass storage devices. The backplanes described herein are equipped with an integrated circuit capable of utilizing multiple interfaces and protocols for exchanging backplane management information with the host computer 100 or with another computer equipped with a host bus adapter (HBA) utilizing a different backplane management interface and protocol. It should be appreciated that the architecture of the host computer 100 is merely illustrative and that any type of computer capable of hosting an HBA with backplane management functionality may be utilized. The host computer 100 of the present disclosure may be implemented utilizing a general purpose computer, a custom application specific integrated circuit, a field-programmable gate array (FPGA) device, or any other type of IC or computing known to those skilled in the art.

An illustrative computer architecture for practicing the various embodiments of the present disclosure will now be described. In particular, a host computer 100 is utilized that is equipped with an HBA. In order to provide this functionality, the host computer 100 includes a baseboard, or "motherboard", which is a printed circuit board to which a multitude of components or devices may be connected by way of a system bus or other electrical communication path. In one illustrative embodiment, a processor ("processor" or "CPU") 102 operates in conjunction with a chipset 104. The CPU 102 is a standard central processor that performs arithmetic and logical operations necessary for the operation of the host computer 100.

The chipset 104 includes a north bridge 106 and a south bridge 108. The north bridge 106 provides an interface between the CPU 102 and the remainder of the host computer 100. The north bridge 106 also provides an interface to the random access memory ("RAM") 114 and, possibly, an on-board graphics adapter 112. The north bridge 106 may also include functionality for providing networking functionality through a gigabit Ethernet adapter 110. The gigabit Ethernet adapter 110 is capable of connecting the host computer 100 to another computer via a network. Connections which may be made by the network adapter 110 may include local area network ("LAN"), wide area network ("WAN") or Wi-Fi connections. LAN, WAN and Wi-Fi networking environments are commonplace in offices, enterprise-wide computer networks, intranets, and the Internet. The north bridge 106 is connected to the south bridge 108.

The south bridge 108 is responsible for controlling many of the input/output functions of the host computer 100. In particular, the south bridge 108 may provide one or more universal serial bus ("USB") ports 116, a sound adapter 124, an Ethernet controller 134, and one or more general purpose input/output ("GPIO") pins 118. The south bridge 108 may also provide a system management bus 132 for use in managing the various components of the host computer 100. Power management circuitry 126 and clock generation circuitry 128 may also be utilized during the operation of the south bridge 108. The south bridge 108 may also provide a bus for interfacing peripheral card devices such as a graphics adapter 130. In one embodiment, the bus comprises a peripheral component interconnect ("PCI") bus 133. The PCI bus 133 may also be utilized to interface with one or more host bus adapters (HBAs), such as the SATA or SAS HBA 131. As described in greater detail below, the HBA 131 may be connected to a backplane for providing backplane management functionality.

According to embodiments, the south bridge 108 can be an enhanced south bridge operative to provide an HBA for connecting mass storage devices to the host computer 100 without the use of an add-in card such as the PCI HBA 131.

For instance, according to an embodiment, the south bridge 108 includes a serial advanced technology attachment ("ATA") adapter for providing one or more serial ATA ports 120 and an ATA 100 adapter for providing one or more ATA 100 ports 122. The serial ATA ports 120 and the ATA 100 ports 122 may be, in turn, connected directly to one or more mass storage devices storing an operating system and application programs. As known to those skilled in the art, an operating system comprises a set of programs that control operations of a computer and allocation of resources. An application program is software that runs on top of the operating system software and uses computer resources made available through the operating system to perform application specific tasks desired by the user. Alternatively, the serial ATA ports 120 may be connected to a backplane for providing backplane management functionality.

The mass storage devices connected to the south bridge 108, and its associated computer-readable media provide non-volatile storage for the host computer 100. Although the description of computer-readable media contained herein refers to a mass storage device, such as a hard disk or CD-ROM drive, it should be appreciated by those skilled in the art that computer-readable media can be any available media that can be accessed by the host computer 100. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

A low pin count ("LPC") interface may also be provided by the south bridge 108 for connecting a "Super I/O" device 138. The Super I/O device 138 is responsible for providing a number of input/output ports, including a keyboard port, a mouse port, a serial interface, a parallel port, and other types of input/output ports. The LPC interface may also connect a read-only memory ("ROM") device for storing a basic input/output system ("BIOS") 136 of an extensible firmware interface ("EFI") compatible firmware that includes program code containing the basic routines that help to start up the host computer 100 and to transfer information between elements within the host computer 100. It should be appreciated that the host computer 100 may comprise other types of computing devices, including hand-held computers, embedded computer systems, personal digital assistants, and other types of computing devices known to those skilled in the art. It is also contemplated that the host computer 100 may not include all of the components shown in FIG. 1, may include other components that are not explicitly shown in FIG. 1, or may utilize an architecture completely different than that shown in FIG. 1.

Figure 2:
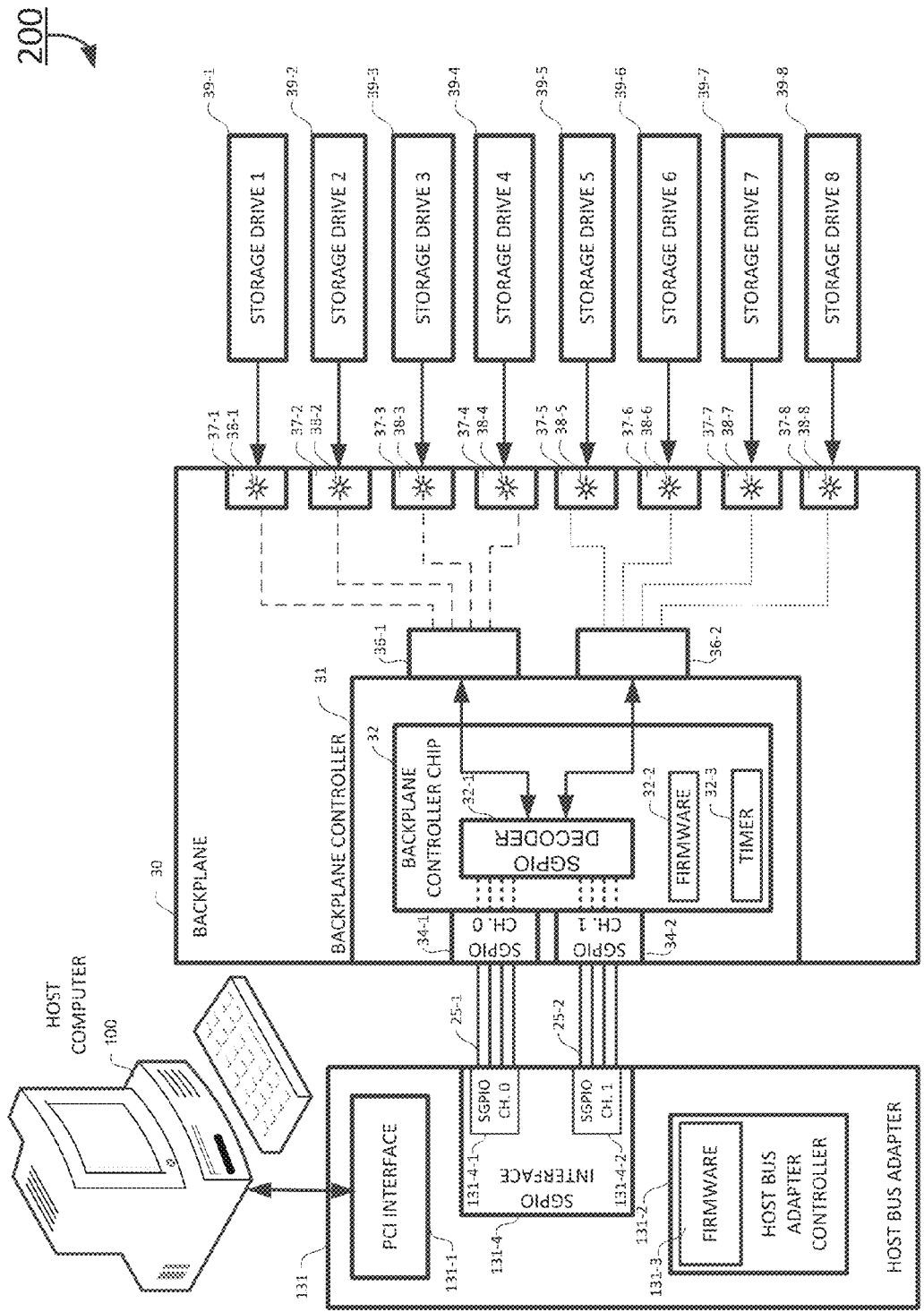
FIG. 2 schematically shows a block diagram of a backplane controller capable of handling two SGPIO channels using one SGPIO decoder according to certain embodiments of the present disclosure.

Turning now to FIG. 2, where a block diagram of an enclosure management controller (EMC) environment is schematically shown according to one embodiment of the present disclosure. This EMC environment includes: (a) a host computer 100 having a peripheral component interconnect (PCI) bus interface and an EMC management software installed, (b) a host bus adapter (HBA) 131, (c) a backplane 30 having a backplane controller 31 with a backplane controller chip 32 installed.

Generally, one backplane controller chip can monitor and manage up to 8 storage drives. In this embodiment, eight storage drives are divided into two groups: a first group of drive slots, and a second group of drive slots. The first group of drive slots includes: a first storage drive 39-1, a second storage drive 39-2, a third storage drive 39-3, and a fourth storage drive 39-4. The second group of drive slots includes: a fifth storage drive 39-5, a sixth storage drive 39-6, a seventh storage drive 39-7, and an eighth storage drive 39-8.

The first group of drive slots is connected to the backplane 30 through four separate storage drive connectors 37-1, 37-2, 37-3, and 37-4, and the second group of drive slots is connected to the backplane 30 through another four separate storage drive connectors 37-5, 37-6, 37-7, and 37-8. On each of the storage drive connectors, there are one or more LEDs indicating the status and working conditions of the storage drives. These LEDs are shown as 38-1, 38-2, 38-3, 38-4, 38-5, 38-6, 38-7, and 38-8, respectively.

In certain embodiments, these LEDs 38-1 through 38-8 typically include 2 or 3 LEDs per storage drive. For backplanes with 2 LEDs per storage drive, they include a first green LED indicating presence and/or activity, and a second LED indicating Status. For backplanes with 3 LEDs per storage drive, they include a first green LED indicating presence and/or activity, a second LED indicating Locate, and a third LED indicating Fail.

Although many hardware vendors define their own proprietary LED blinking pattern, the common standard for SGPIO interpretation and LED blinking pattern can be found in an internal computer hardware standard—International Blinking Pattern Interpretation (IBPI). IBPI was defined by the SFF-8489 specification of the Small Form Factor Special Interest Group in 2011, and its specification is incorporated herein by reference in its entirety.

In one embodiment, as shown in FIG. 2, the HBA 131 has: (a) a PCI interface 131-1, (b) a host bus adaptor controller 131-2 having firmware 131-3 for the host bus adaptor controller 131-2, (c) an SGPIO interface 131-4. The PCI interface 131-1 is used to communicate with the host computer 10. When a user uses the host computer to monitor and manage the storage drives 39-1 through 39-8 on the backplane 30, the user uses the EMC management software to send control commands and control data to these storage drives and to receive responses from these storage drives. The firmware 131-3 on the HBA controller 131-2 is used to control the operation of the HBA 131, and to assist the communication between the host computer and the storage drives on the backplane 30. The SGPIO interface 131-4 includes a first SGPIO channel 131-4-1 for monitoring and managing the first group of drive slots 39-1 through 39-4, and a second SGPIO channel 131-4-2 for monitoring and managing the second group of drive slots 39-through 39-8, respectively. These two channels are connected to the backplane through a first SGPIO bus 25-1 and a second SGPIO bus 25-2.

In certain embodiments, the backplane 30 includes a backplane controller 31, and eight storage connectors 37-1 through 37-8 for connecting the eight storage drives 39-1 through 39-8. The backplane controller has a backplane controller chip 32, a first SGPIO output connector 36-1, and a second SGPIO output connector 36-2. The first SGPIO output connector 36-1 of the backplane controller 31 is used for connecting to the first group of drive slots 39-1 through 39-4. The second SGPIO output connector 36-2 of the backplane controller 31 is used for connecting to the second group of drive slots 39-5 through 39-8.

According to embodiments, the backplane controller chip 32 shown in FIG. 2 is equipped with multiple physical interfaces commonly used by various vendors for communicating backplane management data with an HBA or, in this example, the HBA 131. For instance, the backplane controller chip 32 may include a first SGPIO channel interface 34-1 for SGPIO channel 0, and a second SGPIO channel interface 34-2 for SGPIO Channel 1 for communicating backplane management data with an SAS-equipped HBA.

The SGPIO interface connects the HBA 131 and the backplane 30 with four wires. Each of the first SGPIO channel 131-4-1 and the second SGPIO channel 131-4-2 supports four signals: (1) a dedicated clock line SCLOCK, (2) a SLOAD line, (3) a SDATAOUT line, and (4) a SDATAIN line. The dedicated clock line SCLOCK is driven by the HBA 131 (its maximum clock rate is 100 kHz), although many implementations use slower ones (typically 48 kHz). The SLOAD line is synchronous to the clock and is used to indicate the start of a new frame of data. A new SGPIO frame is indicated by SLOAD line being high at a rising edge of a clock after having been low for at least 5 clock cycles. The following 4 falling clock edges after a start condition is used to carry a 4-bit value from the HBA 131 to the backplane 30; the definition of this value is proprietary and varies between system vendors. The SDATAOUT line carries 3 bits of data from the HBA 131 to the backplane 30: the first bit typically carries activity; the second bit carries locate; and the third bit carries fail. A low value for the first bit indicates no activity and a high value indicates activity. The SDATAIN line is used by the backplane 30 to send data back to the HBA 131 to indicate some condition on the backplane 30. The first bit being high commonly indicates the presence of a drive. The two following bits are typically unused and driven low. Because this line would be high for all 3 bits when no backplane is connected, an HBA can detect the presence of a backplane by the second or third bit of the SDATAIN line being driven low. The SDATAIN line and SDATAOUT line then repeats with 3 clocks per drive until the last drive is reached, and the cycle starts over again. In certain embodiments with low cost backplane controller chip solution, the SDATAIN may not be supported.

In certain embodiments, the backplane controller 31 has a first SGPIO channel interface 34-1, a second SGPIO channel interface 34-2, and a backplane controller chip 32. The first SGPIO channel interface 34-1 is used to receive the control commands and control data for monitoring and managing the first group of drive slots, and the second SGPIO channel interface 34-2 is used to receive the control commands and control data for monitoring and managing the second group of drive slots.

In certain embodiments, the backplane controller chip 32 has a first SGPIO input 34-1, a second SGPIO input 34-2, one or two SGPIO decoders 32-1, a first SGPIO output connector 36-1, a second SGPIO output connector 36-2, firmware 32-2, and a timer 32-2. Conventionally, backplane controller chip has two SGPIO decoders, one for the first SGPIO input, and the other for the second SGPIO input. However, due to the fact that input SGPIO signals stay on the SGPIO bus in a relatively long time, one SGPIO decoder can be used to selectively decode the first SGPIO input for a certain amount of time, switch to decode the second SGPIO input for a substantially similar amount of time, and repeat this process alternatively. In certain embodiments, the timer 32-2 of the backplane controller chip 32 provides the backplane controller a timing signal for switching between the first SGPIO input and second SGPIO input. The timing signal has a first time period and a second time period. In one embodiment, the first time period is 1 second long and the second time period is also 1 second long. The length of the first timing period and the second time period can be adjusted. Removing one SGPIO decoder means significant savings of production cost, and the space of backplane controller chip.

In certain embodiments, the control commands and control data for the first group of drive slots from the host computer 100 are received at the first SGPIO input 34-1 through the first SGPIO bus 25-1, and the control commands and control data for the second group of drive slots from the host computer 100 are received at the second SGPIO input 34-2 through the second SGPIO bus 25-2.

Figure 3:
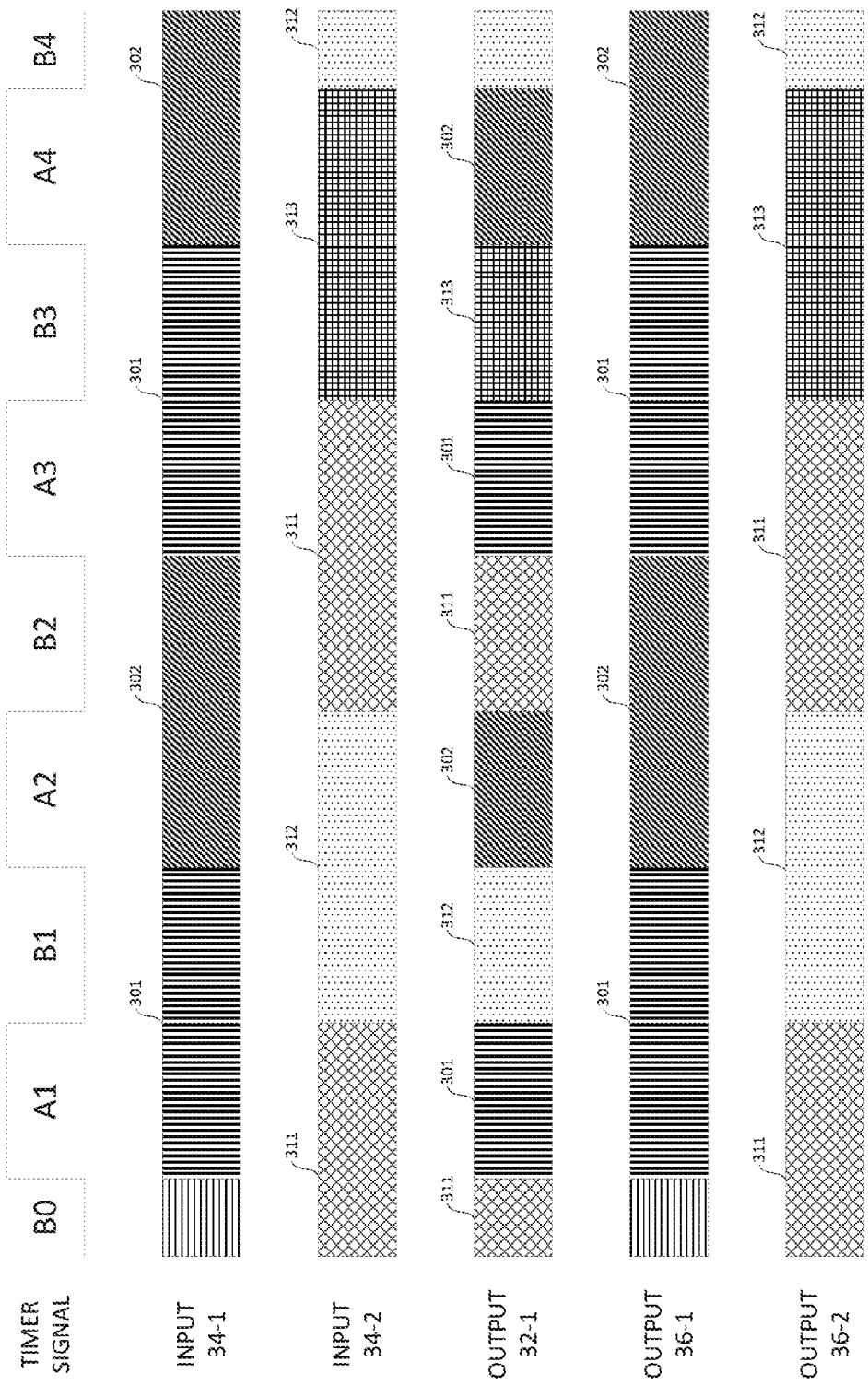
FIG. 3 illustrates input and output signals of a first SGPIO channel and a second SGPIO channel at different interface terminals of the backplane controller along with a clock signal according to certain embodiments of the present disclosure.

FIG. 3 illustrates input SGPIO signals of the first SGPIO channel interface 34-1 and the second SGPIO channel interface 34-2, the output SGPIO signal at the output of the SGPIO decoder 32-1, the first output SGPIO signals of the first SGPIO output connector 36-1, the second output SGPIO signals of the second SGPIO output connector 36-2 of the backplane controller chip 32 along with the timer 32-3 signal of the backplane controller chip 32 according to certain embodiments of the present disclosure. In certain embodiments, the timer 32-3 signal on the first SGPIO bus 25-1 and the Timer 32-3 signal on the second SGPIO bus 25-2 are synchronized and they are shown as Timer 32-3 signal on the top of FIG. 3. The timer 32-3 signal has a first time period A, and a second time period B. In certain embodiments, the first time period A and a second time period B are substantially equal in duration. In one embodiment, the first time period A and a second time period B are both 1 second long. In other embodiment, the first time period A and a second time period B can be adjusted according to the speed of the signal changes at the first SGPIO channel interface 34-1 and the second SGPIO channel interface 34-2.

The first SGPIO input 34-1 and the second SGPIO input 34-2 are both directed to the SGPIO decoder 32-1. Under the control of the firmware 32-2 of the backplane controller chip 32, during the first time period A, the SGPIO decoder 32-1 decodes the SGPIO signal from the first SGPIO input 34-1 and forwards the decoded SGPIO signal to the first SGPIO output connector 36-1, and during the second time period B, the SGPIO decoder 32-1 decodes the SGPIO signal from the second SGPIO input 34-2 and forwards the decoded SGPIO signal to the second SGPIO output connector 36-2, respectively.

The decoding process for the first SGPIO channel interface 34-1 starts at the rising edge of the clock pulse of the first time period A, and the decoding process for the second SGPIO channel interface 34-2 starts at the falling edge of the clock pulse of the first time period A. The decoded output of the signal at the first SGPIO channel interface 34-1 is directed to the first group of drive slots and delivered to the first SGPIO output connector 36-1 over the output of the SGPIO decoder 32-1. The decoded output of the signal at the second SGPIO channel interface 34-2 is directed to the second group of drive slots and delivered to the second SGPIO output connector 36-2 over the output of the SGPIO decoder 32-1.

In one embodiment, during the second time period B0, the output of the SGPIO decoder 32-1 is a decoded second SGPIO signal 311. During the first time period A1, the output of the SGPIO decoder 32-1 is a decoded first SGPIO signal 301. During the second time period B1, the output of the SGPIO decoder 32-1 is a decoded second SGPIO signal 312. During the first time period A2, the output of the SGPIO decoder 32-1 is a decoded first SGPIO signal 302. During the second time period B2, the output of the SGPIO decoder 32-1 is a decoded second SGPIO signal 311. During the first time period A3, the output of the SGPIO decoder 32-1 is a decoded first SGPIO signal 301. During the second time period B3, the output of the SGPIO decoder 32-1 is a decoded second SGPIO signal 313. During the first time period A4, the output of the SGPIO decoder 32-1 is a decoded first SGPIO signal 302. During the second time period B4, the output of the SGPIO decoder 32-1 is a decoded second SGPIO signal 312.

Due to the switching of the output between the first SGPIO output connector 36-1 and the second SGPIO output connector 36-2, each of the first SGPIO channel and the second SGPIO channel only have half of cycle (the first time period A and the second time period B) to process the input signal and obtain the output, the first SGPIO output connector 36-1 remain unchanged during the second time period B, and the second SGPIO output connector 36-2 remain unchanged during the first time period A. Therefore, the SGPIO signal at the first SGPIO output connector 36-1 is the same as the SGPIO signal at the first SGPIO channel interface 34-1, and the SGPIO signal at the second SGPIO output connector 36-2 is the same as the SGPIO signal at the second SGPIO channel interface 34-2. Although if the timer 32-3 signal is long enough, some portion of the decoded signal 301, 302, 311, 312, or 313 may be lost during the switching between the first SGPIO channel and the second SGPIO channel. However, the timer 32-3 signal can be adjusted based on the rate of SGPIO signal change. If the timer 32-3 signal is adjusted to the fastest SGPIO signal change rate, then there will be no signal loss during the switching between the first SGPIO channel and the second SGPIO channel. For example, when the timer 32-3 signal is twice as fast as any signal changes in the first SGPIO channel and the second SGPIO channel, as shown in FIG. 3, there will be no SGPIO signal loss. The first SGPIO output connector 36-1 and the second SGPIO output connector 36-2 will be the decoded signals at the first SGPIO channel interface 34-1, and the second SGPIO channel interface 34-2, respectively.

In one embodiment, the host computer 100 can transmit control commands and control to the backplane controller 31 to monitor and manage one or more of the storage drives 39-1 through 39-8 installed on the backplane 30. For example, the control commands can be those that are typically issued through the host bus adapter for use with SATA mass storage devices or compatible with SAS mass storage devices. It should be appreciated that the control commands issued by the HBA 131 can be those typically issued by other types of HBAs compatible with other types of mass storage devices.

According to embodiments of the present disclosure, different physical interfaces may be utilized by the HBA 131 to exchange backplane management data between the HBA 131 and the backplane 30. For instance, some SAS-compatible HBAs are equipped with an SGPIO interface utilizing the first SGPIO output connector 36-1, and the second SGPIO output connector 36-2, while some SATA-compatible HBAs, on the other hand, utilize a control or management bus, such as the system management bus through the system management bus (SMBus) (not shown in FIG. 2), to exchange backplane management data between the backplane 30 and the HBA 131. System Management Bus (SMBus) Specification version 2.0, published on Aug. 3, 2000, is incorporated herein by reference in its entirety.

It should be appreciated that the particular physical interfaces described herein for exchanging backplane management information with the backplane are merely illustrative and that any physical communications link suitable for transmitting backplane management data may be utilized with the various aspects of the present disclosure. In this embodiment, the HBA 131 supports multiple backplane management interfaces and protocols, such as system management bus, SGPIO, or some custom backplane management bus. The backplane controller used in this embodiment has the first SGPIO output connector 36-1 and the second SGPIO output connector 36-2, and can support backplanes 30 utilizing the SGPIO bus, and all standard SGPIO bus management commands. In many circumstances, $I^2C$ buses, connectors, and control firmware can be used in place of system management buses, connectors, and control firmware.

It is also possible that an HBA can be configured to support a particular backplane management protocol by upgrading the backplane controller firmware 32-2, or by using host-side applications, command line utilities, or configuration monitors i.e. over a direct serial port to the HBA 131. This same access and configuration method could be used to change or otherwise configure specific instructions and commands that are sent to the backplane.

As discussed briefly above, the backplane 30 provides a number of backplane management functions. To enable this functionality, the backplane 30 is equipped with a backplane controller chip 32. The backplane controller chip 32 is operative to receive backplane management control commands and control data from the HBA 131 on one of any number of physical interfaces, such as system management bus and/or SGPIO bus, and to perform various management functions in response to the management data received. For instance, the backplane controller chip 32 may receive data from the HBA 131 instructing it to illuminate one of LEDs 38-1 through 38-8 for locating a particular one of the storage drives 39-1 through 39-8, respectively. The backplane controller chip 32 may also illuminate the LEDs 38-1 through 38-8 to indicate activity on the storage drives 39-1 through 39-8, respectively. The LEDs 38-1 through 38-8 may also be illuminated by the backplane controller chip 32 to indicate that one of the storage drives 39-1 through 39-8 has failed. LEDs 38-1 through 38-8 may also be illuminated to provide a global indication that one of the storage drives 39-1 through 39-8, or a storage drive connected to another connected backplane, is active or has failed. The backplane controller chip 32 may also provide information to the HBA 131. For instance, data indicating whether a particular storage drive is mated to the backplane 30 may be provided by the backplane controller chip 32 to the HBA 131.

Referring now to FIG. 4, a device number, timing periods and drive number table is shown according certain embodiments of the present disclosure. In certain embodiments, each of the first group of drive slots and the second group of drive slots includes up to four storage drives. Each of the four storage drives of the first group of drive slots is represented by a first device number 1 through 4 and the first device number is a part of the control data transmitted from the host computer 100 to the backplane controller 31. Each of the four storage drives of the second group of drive slots is represented by a second device number also 1 through 4 and the second device number is also a part of the control data transmitted from the host computer 100 to the backplane controller 31. For example, the first group of drive slots includes the first storage drive (first device number 1), the second storage drive (first device number 2), the third storage drive (first device number 3), and the fourth storage drive (first device number 4). The second group of drive slots includes the fifth storage drive (second device number 1), the sixth storage drive (second device number 2), the seventh storage drive (second device number 3), and the eighth storage drive (second device number 4). Therefore, at any time, the first device number and the second device number 1 through 4 are transmitted to the backplane controller 32 as a part of control data from the first SGPIO channel interface 34-1 and the second SGPIO channel interface 34-2. However, they represent the first group of drive slots 39-1 through 39-4, and the second group of drive slots 39-5 through 39-8, respectively. Although the first device number and the second device number on both SGPIO buses are both 1 through 4, during the first time period A, the decoded SGPIO signal at the output of the SGPIO decoder 32-1 is directed to the first group of drive slots 39-1 through 39-4, and during the second time period B, the decoded SGPIO signal at the output of the SGPIO decoder 32-1 is directed to the second group of drive slots 39-5 through 39-8, respectively.

Additionally, HBA manufacturers may define their own proprietary protocols. In many cases, an HBA manufacturer will utilize a standard protocol, such as IBPI or SGPIO, as the foundation for its protocol but will modify the standard protocol to define its own proprietary protocol. For instance, an HBA manufacturer may change the order that data is presented or add particular proprietary data to the protocol. In certain embodiments, the HBA 131 can be configured to transmit control commands and control data in accordance with various proprietary protocols.

Figure 5:
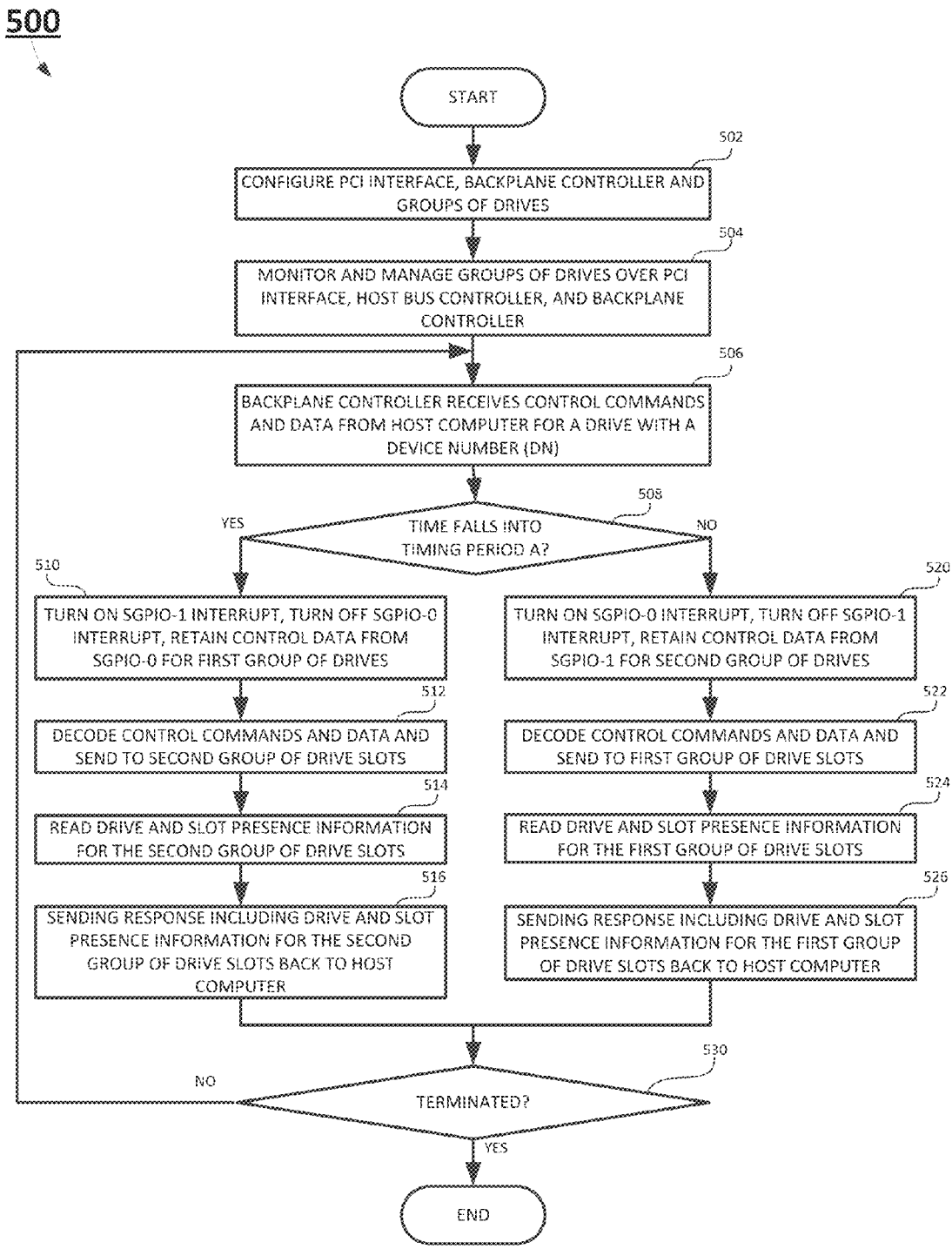
FIG. 5 shows a block diagram of the operation of the backplane controller capable of handling two SGPIO channels using one SGPIO decoder according certain embodiments of the present disclosure.

Referring now to FIG. 5, a block diagram of the operation of the backplane controller capable of handling two SGPIO channels using one SGPIO decoder is shown according certain embodiments of the present disclosure.

At the start operation 502, a user uses EMC management software on the host computer 100 to configure the PCI interface of the host computer 100, the PCI interface 131-1 of the host bus adapter (HBA) 131, the backplane controller, and the first group of drive slots 39-1 through 39-4, the second group of drive slots 39-5 through 39-8. The configuration includes the selection of storage drive management protocol such as serial general purpose input/output (SGPIO) and intelligent platform management interface (IPMI), the number of storage drives installed on the first group of drive slots, and the second group of drive slots, the clock rate, and many other parameters necessary for the EMC management software on the host computer 100 to monitor and manage the first group of drive slots 39-1 through 39-4 and the second group of drive slots 39-5 through 39-8.

At operation 504, the EMC management software on the host computer 100 is used to monitor and manage the first group of drive slots 39-1 through 39-4 and the second group of drive slots 39-5 through 39-8, over the PCI interface 131-1 of the HBA 131, the HBA 131, the first SGPIO bus 25-1 and the second SGPIO bus 25-2, the first SGPIO channel interface 34-1 and the second SGPIO channel interface 34-2, the SGPIO decoder 32-1, the first SGPIO output connector 36-1 and the second SGPIO output connector 36-2, the first group of drive slots 39-1 through 39-4, and the second group of drive slots 39-5 through 39-8.

At operation 506, the first SGPIO channel interface 34-1 of the backplane controller 31 may receive control commands and control data from the EMC management software of the host computer 100 for monitoring and manage a drive of the first group of drive slots 39-1 through 39-4. In the meantime, the second SGPIO channel interface 34-2 of the backplane controller 31 may receive control commands and control data from the EMC management software of the host computer 100 for monitoring and manage a drive of the second group of drive slots 39-5 through 39-8. As discussed earlier, the control data includes a device number to which the control commands and control data are directed. The first device number 1 through 4 of the first group of drive slots represent the first storage drive 39-1, the second storage drive 39-2, the third storage drive 39-3, and the fourth storage drive 39-4, respectively. The second device number 1 through 4 of the second group of drive slots represent the fifth storage drive 39-5, the sixth storage drive 39-6, the seventh storage drive 39-7, and the eighth storage drive 39-8. In addition to the control commands and control data received at the first SGPIO channel interface 34-1 and the second SGPIO channel interface 34-2, the backplane controller chip 32 has a timer 32-2 signal. The Timer 32-3 signal includes a first time period A, and a second time period B. In certain embodiments, the first time period A and the second time period B are substantially equal in length.

At an inquiry operation 508, the backplane controller chip 32 operating with the firmware 32-2 of the backplane controller chip 32 checks the timing of timer 32-3 signal. If the current timing falls into the first time period A, the process continues to next operation 510. If the current timing falls into the second time period B, the process continues to next operation 520.

When the current time falls into the first time period A, at operation 510, the backplane controller chip 32 turns on the interrupt for SGPIO channel 1, turns off the interrupt for SGPIO channel 0, and retains the control commands and control data from SGPIO channel 0 for the storage drive designated by the first device number of the first group of drive slots.

At operation 512, the control commands and control data received from the first SGPIO channel interface 34-1 of the backplane controller 31 are decoded by the SGPIO decoder 32-1, and forwarded to the corresponding storage drive designated by the first device number of the first group of drive slots.

At operation 514, the SGPIO decoder 32-1 may receive response from the storage drive to which the control commands and control data are directed. In certain embodiment, when the SDATAIN signal is not supported, this operation 514 is skipped.

At operation 516, if the SGPIO decoder 32-1 receives response from the storage drive to which the control commands and control data are directed, the SGPIO decoder 32-1 may encode the received response and send the encoded response back to the host computer 100 through the first SGPIO bus 25-1, the first SGPIO channel 131-4-1 of the SGPIO interface 131-4 of the HBA 131, the PCI interface 131-1 of the HBA 131. In certain embodiment, when the SDATAIN signal is not supported, this operation 516 is skipped.

On the other hand, when the current timing falls into the second time period B, at operation 520, the backplane controller chip 32 turns on the interrupt for SGPIO channel 0, turns off the interrupt for SGPIO channel 1, and retains the control commands and control data from SGPIO channel 1 for the storage drive designated by the second device number of the second group of drive slots.

At operation 522, the control commands and control data received from the second SGPIO channel interface 34-2 of the backplane controller 31 are decoded by the SGPIO decoder 32-1, and forwarded to the corresponding storage drive designated by the second device number of the second group of drive slots.

At operation 524, the SGPIO decoder 32-1 may receive response from the storage drive to which the control commands and control data are directed. In certain embodiment, when the SDATAIN signal is not supported, this operation 524 is skipped.

At operation 526, if the SGPIO decoder 32-1 receives response from the storage drive to which the control commands and control data are directed, the SGPIO decoder 32-1 may encode the received response and send the encoded response back to the host computer 100 through the second SGPIO bus 25-2, the second SGPIO channel 131-4-2 of the SGPIO interface 131-4 of the HBA 131, the PCI interface 131-1 of the HBA 131. In certain embodiment, when the SDATAIN signal is not supported, this operation 526 is skipped.

Once either operations 510 through 516 or operations 520 through 526 are carried out, the monitoring and management process proceeds to an inquiry operation 530 to check if the user wants to terminate the monitoring and management process. If the user wants to terminate the monitoring and management process, the monitoring and management process is then terminated. Otherwise, the monitoring and management process returns to the operation 506 to continue the monitoring and management process.

The foregoing description of the exemplary embodiments of the present disclosure has been presented only for the purposes of illustration and description and is not intended to be exhaustive or to limit the present disclosure to the precise forms disclosed. Many modifications and variations are possible in light of the above teaching.

The embodiments were chosen and described in order to explain the principles of the present disclosure and their practical application so as to enable others skilled in the art to utilize the present disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A backplane controller of a backplane and for handling two serial general purpose input/output (SGPIO) channels by using one SGPIO decoder, comprising:
   a backplane controller chip;
   a first SGPIO channel interface in communication with a first SGPIO channel for receiving control commands and control data from a user at a host computer for a first group of drive slots on the backplane;
   a second SGPIO channel interface in communication with a second SGPIO channel for receiving control commands and control data from the user at the host computer for a second group of drive slots on the backplane, wherein the first SGPIO channel and the second SGPIO channel are provided at an SGPIO interface at a host bus adapter (HBA), wherein the first SGPIO channel interface and the second SGPIO channel interface at the backplane controller are in communication with the first SGPIO channel and the second SGPIO channel at the HBA, respectively;
   an SGPIO decoder in communication with the first group of drive slots and the second group of drive slots in an alternating base according a clock signal;
   a first SGPIO output configured to connect with the output of the SGPIO decoder to the first group of drive slots;
   a second SGPIO output configured to connect with the output of the SGPIO decoder to the second group of drive slots;
   a timer; and
   firmware of the backplane controller.

2. The backplane controller of claim 1, wherein the communication between the first SGPIO channel interface of the backplane controller and the first SGPIO channel of the SGPIO interface of the HBA is through a first SGPIO bus, the communication between the second SGPIO channel interface of the backplane controller and the second SGPIO channel of the SGPIO interface of the HBA is through a second SGPIO bus.

3. The backplane controller of claim 1, wherein each of the first group of drive slots and the second group of drive slots comprises a plurality of storage drives, and each of the first group of drive slots is designated by a first device number, and each of the second group of drive slots is designated by a second device number.

4. The backplane controller of claim 3, wherein the backplane controller is in communication with the host computer through the HBA, the HBA further comprising:
   a PCI interface configured for the user to send control commands and control data to at least one drive of the first group of drive slots and the second group of drive slots for monitoring and controlling the at least one drive, and receive response from the at least one drive; and
   a host bus adapter controller having firmware configured to perform HBA operations.

5. The backplane controller of claim 4, wherein the firmware of the backplane controller is configured to perform one or more of following operations:
   receiving control commands and control data from the user for monitoring and controlling the first group of drive slots through the first SGPIO channel interface of the backplane controller chip; and receiving control commands and control data from the user for monitoring and controlling the second group of drive slots through the second SGPIO channel interface of the backplane controller chip;
   checking a timer signal having a first time period and a second time period, from the backplane controller chip;
   forwarding the control commands and control data from the first SGPIO channel interface of the backplane controller chip to the first group of drive slots through the first SGPIO output during the first time period, and forwarding the control commands and control data from the second SGPIO channel interface of the backplane controller chip to the second group of drive slots through the second SGPIO output during the second time period;
   receiving response through the first SGPIO output from the drive of the first group of drive slots to which the control commands and control data are directed during the first time period, and receiving response through the second SGPIO output from the drive of the second group of drive slots to which the control commands and control data are directed during the second time period; and
   sending the response from the drive of the first group of drive slots to the host computer through the first SGPIO channel interface of the backplane controller chip, and sending the response from the drive of the second group of drive slots to the host computer through the second SGPIO channel interface of the backplane controller chip.

6. The backplane controller of claim 5, wherein the first time period and the second time are substantially equal.

7. The backplane controller of claim 5, wherein control data comprise the first device number for the drive of the first group of drive slots to which the control commands and control data are directed, and the second device number for the drive of the second group of drive slots to which the control commands and control data are directed.

8. The backplane controller of claim 5, wherein the control commands and the control data are configured in accordance with the SGPIO specification to instruct the backplane controller to monitor the drive and LEDs associated with the drive, and control the functions of the drive, and the LEDs associated with the drive.

9. The backplane controller of claim 5, wherein the control commands and the control data are configured in accordance with the intelligent platform management interface (IPMI) specification to instruct the backplane controller to monitor the drive and LEDs associated with the drive, and control the functions of the drive, and the LEDs associated with the drive.

10. The backplane controller of claim 9, wherein the IPMI control commands comprises a plurality of extended OEM IPMI commands.

11. A computer-implemented method for handling two SGPIO channels by using one SGPIO decoder, comprising:
   establishing communication between a backplane controller on a backplane and a host computer through a host bus adapter (HBA) over an SGPIO interface at the HBA;
   receiving control commands and control data for monitoring and controlling a first group of drive slots through a first SGPIO channel interface of the backplane controller; and
   receiving control commands and control data for monitoring and controlling a second group of drive slots through a second SGPIO channel interface of the backplane controller, wherein a first SGPIO channel and a second SGPIO channel are provided at the SGPIO interface at the HBA, wherein the first SGPIO channel interface and the second SGPIO channel interface at the backplane controller are in communication with the first SGPIO channel and the second SGPIO channel at the HBA, respectively;
   checking a timer signal having a first time period and a second time period, from the backplane controller;
   forwarding the control commands and control data from the first SGPIO channel interface of the backplane controller chip to the first group of drive slots through a first SGPIO output of the backplane controller during the first time period, and forwarding the control commands and control data from the second SGPIO channel interface of the backplane controller chip to the second group of drive slots through a second SGPIO output of the backplane controller during the second time period;
   receiving response through the first SGPIO output from the drive of the first group of drive slots to which the control commands and control data are directed during the first time period, and receiving response through the second SGPIO output from the drive of the second group of drive slots to which the control commands and control data are directed during the second time period; and
   sending the response from the drive of the first group of drive slots to the host computer through the first SGPIO channel interface of the backplane controller chip, and sending the response from the drive of the second group of drive slots to the host computer through the second SGPIO channel interface of the backplane controller chip.

12. The computer-implemented method of claim 11, wherein the backplane controller is in communication with the host computer through the HBA, the HBA further comprising:
   a PCI interface configured for the user to send control commands and control data to at least one drive of the first group of drive slots and the second group of drive slots for monitoring and controlling the at least one drive, and receive response from the at least one drive; and
   a host bus adapter controller having firmware configured to perform HBA operations.

13. The computer-implemented method of claim 12, wherein
   the first SGPIO channel interface is in communication with the first SGPIO channel of the SGPIO interface of the HBA for receiving control commands and control data from the user at the host computer for the first group of drive slots on the backplane;
   wherein the second SGPIO channel interface is in communication with the second SGPIO channel of the SGPIO interface of the HBA for receiving control commands and control data from the user at the host computer for the second group of drive slots on the backplane;
   wherein the backplane controller further comprises:
      an SGPIO decoder in communication with the first group of drive slots and the second group of drive slots in an alternating base according a clock signal;
      a first SGPIO output configured to connect with the output of the SGPIO decoder to the first group of drive slots;
      a second SGPIO output configured to connect with the output of the SGPIO decoder to the second group of drive slots;
      a timer; and
      firmware of the backplane controller.

14. The computer-implemented method of claim 13, wherein the communication between the first SGPIO channel interface of the backplane controller and the first SGPIO channel of the SGPIO interface of the HBA is through a first SGPIO bus, the communication between the second SGPIO channel interface of the backplane controller and the second SGPIO channel of the SGPIO interface of the HBA is through a second SGPIO bus.

15. The computer-implemented method of claim 11, wherein each of the first group of drive slots and the second group of drive slots comprises a plurality of drives, and each of the first group of drive slots is designated by a first device number, and each of the second group of drive slots is designated by a second device number.

16. The computer-implemented method of claim 15, wherein control data comprise the first device number for the drive of the first group of drive slots to which the control commands and control data are directed, and the second device number for the drive of the second group of drive slots to which the control commands and control data are directed.

17. The computer-implemented method of claim 11, wherein the first time period and the second time are substantially equal.

18. The computer-implemented method of claim 11, wherein the control commands and control data are configured in accordance with the SGPIO specification to instruct the backplane controller to monitor the drive and LEDs associated with the drive, and control the functions of the drive, and the LEDs associated with the drive.

19. The computer-implemented method of claim 11, wherein the control commands and the control data are configured in accordance with the IPMI specification to instruct the backplane controller to monitor the drive and LEDs associated with the drive, and control the functions of the drive, and the LEDs associated with the drive.

20. The computer-implemented method of claim 19, wherein the IPMI control commands comprises a plurality of extended OEM IPMI commands.

21. A non-transitory computer storage medium having computer-executable instructions stored thereon which, when executed by a processor of a backplane controller, cause the processor to perform following operations to handling two SGPIO channels by using one SGPIO decoder:
establishing communication between a backplane controller on a backplane and a host computer through a host bus adapter (HBA) over an SGPIO interface at the HBA;
receiving control commands and control data from a user for monitoring and controlling a first group of drive slots through a first SGPIO channel interface of the backplane controller; and receiving control commands and control data from the user for monitoring and controlling a second group of drive slots through a second SGPIO channel interface of the backplane controller, wherein a first SGPIO channel and a second SGPIO channel are provided at the SGPIO interface at the HBA, wherein the first SGPIO channel interface and the second SGPIO channel interface at the backplane controller are in communication with the first SGPIO channel and the second SGPIO channel at the HBA, respectively;
checking a timer signal having a first time period and a second time period, from the backplane controller;
forwarding the control commands and control data from the first SGPIO channel interface of the backplane controller chip to the first group of drive slots through a first SGPIO output of the backplane controller during the first time period, and forwarding the control commands and control data from the second SGPIO channel interface of the backplane controller chip to the second group of drive slots through a second SGPIO output of the backplane controller during the second time period;
receiving response through the first SGPIO output from the drive of the first group of drive slots to which the control commands and control data are directed during the first time period, and receiving response through the second SGPIO output from the drive of the second group of drive slots to which the control commands and control data are directed during the second time period; and
sending the response from the drive of the first group of drive slots to the host computer through the first SGPIO channel interface of the backplane controller chip, and sending the response from the drive of the second group of drive slots to the host computer through the second SGPIO channel interface of the backplane controller chip.

22. The non-transitory computer storage medium of claim 21, wherein the backplane controller is in communication with the host computer through the HBA, the HBA further comprising:
a PCI interface configured for the user to send control commands and control data to at least one drive of the first group of drive slots and the second group of drive slots for monitoring and controlling the at least one drive, and receive response from the at least one drive; and
a host bus adapter controller having firmware configured to perform HBA operations.

23. The non-transitory computer storage medium of claim 22, wherein
the first SGPIO channel interface is in communication with the first SGPIO channel of the SGPIO interface of the HBA for receiving control commands and control data from the user at the host computer for the first group of drive slots on the backplane;
wherein the second SGPIO channel interface is in communication with the second SGPIO channel of the SGPIO interface of the HBA for receiving control commands and control data from the user at the host computer for the second group of drive slots on the backplane;
wherein the backplane controller further comprises:
an SGPIO decoder in communication with the first group of drive slots and the second group of drive slots in an alternating base according a clock signal;
a first SGPIO output configured to connect with the output of the SGPIO decoder to the first group of drive slots;
a second SGPIO output configured to connect with the output of the SGPIO decoder to the second group of drive slots;
a timer; and
firmware of the backplane controller.

24. The non-transitory computer storage medium of claim 23, wherein the communication between the first SGPIO channel interface of the backplane controller and the first SGPIO channel of the SGPIO interface of the HBA is through a first SGPIO bus, the communication between the second SGPIO channel interface of the backplane controller and the second SGPIO channel of the SGPIO interface of the HBA is through a second SGPIO bus.

25. The non-transitory computer storage medium of claim 21, wherein each of the first group of drive slots and the second group of drive slots comprises a plurality of drives, and each of the first group of drive slots is designated by a first device number, and each of the second group of drive slots is designated by a second device number.

26. The non-transitory computer storage medium of claim 25, wherein control data comprise the first device number for the drive of the first group of drive slots to which the control commands and control data are directed, and the second device number for the drive of the second group of drive slots to which the control commands and control data are directed.

* * * * *